US007130929B2

(12) United States Patent
Benhase et al.

(10) Patent No.: US 7,130,929 B2
(45) Date of Patent: Oct. 31, 2006

(54) METHOD FOR CONFIGURING SYSTEM ADAPTERS

(75) Inventors: Michael Thomas Benhase, Tucson, AZ (US); Brian Jeffrey Corcoran, Oro Valley, AZ (US); Matthew Joseph Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 09/912,983

(22) Filed: Jul. 25, 2001

(65) Prior Publication Data

US 2003/0023781 A1 Jan. 30, 2003

(51) Int. Cl.
*G06F 3/00* (2006.01)
*G06F 13/00* (2006.01)

(52) U.S. Cl. .............. 710/10; 710/6; 710/8; 710/19
(58) Field of Classification Search .............. 703/25; 710/8, 10, 9
See application file for complete search history.

(56) References Cited

U.S. PATENT DOCUMENTS

| 5,450,570 | A | | 9/1995 | Richek et al. ............. 395/500 |
|---|---|---|---|---|
| 5,524,243 | A | | 6/1996 | Gheorghiu ............... 395/650 |
| 5,675,794 | A | * | 10/1997 | Meredith .................. 710/8 |
| 5,768,542 | A | | 6/1998 | Enstrom et al. .......... 395/284 |
| 5,809,329 | A | | 9/1998 | Lichtman et al. ........ 395/828 |
| 5,905,906 | A | | 5/1999 | Goffinet et al. .......... 395/828 |
| 5,913,051 | A | * | 6/1999 | Leeke ...................... 703/23 |
| 6,006,342 | A | | 12/1999 | Beardsley et al. ........... 714/5 |
| 6,112,256 | A | | 8/2000 | Goffinet et al. ............ 710/8 |
| 6,119,185 | A | * | 9/2000 | Westerinen et al. ......... 710/8 |
| 6,542,945 | B1 | * | 4/2003 | Koker et al. ............... 710/8 |
| 6,823,375 | B1 | * | 11/2004 | Lee et al. .................. 710/8 |
| 2001/0052067 | A1 | * | 12/2001 | Klein ....................... 713/1 |
| 2002/0049693 | A1 | * | 4/2002 | Gase ........................ 707/1 |
| 2002/0073249 | A1 | * | 6/2002 | French et al. .............. 710/8 |

OTHER PUBLICATIONS

IBM Technical Disclosure Bulletin, Multi-Microprocessor Data Delivery System, Sep. 1985, IBM, NN85091534.*

* cited by examiner

*Primary Examiner*—Kim Huynh
*Assistant Examiner*—Joshua D. Schneider
(74) *Attorney, Agent, or Firm*—Dale F. Regelman (57) ABSTRACT

A method to simultaneously configure a plurality of adapters disposed within a computer system, where that computer system includes one or more external computers, and/or one or more data input devices, and/or one or more data output devices, and/or one or more data storage devices. A computer system which includes a computer useable medium having computer readable program code disposed therein to implement Applicants' method to simultaneously configure a plurality of adapters disposed within said computer system. A computer program product usable with a programmable computer processor having computer readable program code embodied therein for simultaneously configuring a plurality of adapters disposed within a computer system.

25 Claims, 7 Drawing Sheets

METHOD FOR CONFIGURING SYSTEM ADAPTERS

The present invention relates to a method to configure a computer system which includes one or more external host computers in combination with one or more data input devices, data output devices, and/or data storage devices.

BACKGROUND OF THE INVENTION

Computer systems may be formed using a variety of hardware and software components. Certain computer systems may, for example, comprise a single processor or multiple processors. Furthermore, individual computers may be connected in intra- or inter-network arrangements to form a larger, distributed computer system. A data storage and retrieval system many times comprises such a distributed computer system.

Such a data storage and retrieval system typically includes a plurality of devices, each dedicated to a particular function. These devices include one or more external host computers in combination with a plurality of data input devices, data output devices, and data storage devices. Such data input/output/storage devices include modems, scanners, hard disk drive units, magnetic tape units, optical disk units, sound/video cards, network adapters, printers, SCSI ports, keyboards, and pointing devices, amongst others. It is often a challenge to configure a computer system such that each of these devices has access to the computer's resources such as interrupt request lines, direct memory access (DMA) channels, memory or input and output address space, etc.

As the complexity of a computer system, such as a data storage and retrieval system, increases, so does the complexity of obtaining a working configuration. Thus, an increase in configuration time is necessarily encountered in configuring computer systems that include multiple processors, multiple host computers, multiple data input devices, multiple data output devices, and/or multiple data storage devices.

In certain data storage and retrieval systems, a plurality of host computers and data input/output/storage devices are typically connected to a number of direct access storage devices (DASDs) comprised of hard disk drives (HDDs). The DASDs may be organized in a redundant array of independent disks, i.e., a RAID array. A RAID array is comprised of multiple, independent disks organized into a large, high-performance logical disk. A controller stripes data across the multiple disks in the array and accesses the disks in parallel to achieve higher data transfer rates.

Those skilled in the art will further appreciate that many computer systems utilize different operating systems, including but not limited to UNIX, DOS, OS/2 and Windows platforms. In many cases obtaining a working configuration is dependent upon the assignment preferences of the operating system.

What is needed is a method to configure a computer system, such as a data storage and retrieval system, which minimizes the time period between power-up/reset of the system and the time when that system is placed in a ready state. In addition, a need thus exists for a configuration method that is applicable to different operating systems.

SUMMARY OF THE INVENTION

Applicants' invention includes a method to configure a computer system which includes one or more host computer adapters in combination with one or more data input device adapters, data output device adapters, and/or data storage device adapters. Applicants' method includes the steps of discovering each of the one or more adapters, sequentially pre-configuring each of those one or more adapters, simultaneously configuring each of the one or more adapters, and placing the computer system in a ready state.

Applicants' invention further includes a data storage and retrieval system which comprises a computer useable medium having computer readable program code disposed therein to implement Applicants' method to simultaneously configure one or more adapters disposed within said data storage and retrieval system. Applicants' invention further includes a computer program product usable with a programmable computer processor having computer readable program code embodied therein for configuring one or more adapters disposed within a computer system.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a data storage and retrieval subsystem for use in a data processing environment. The description of a data storage and retrieval system is not meant to limit Applicants' invention to only data processing applications, as the invention herein can be applied to computer systems in general.

Figure 1:
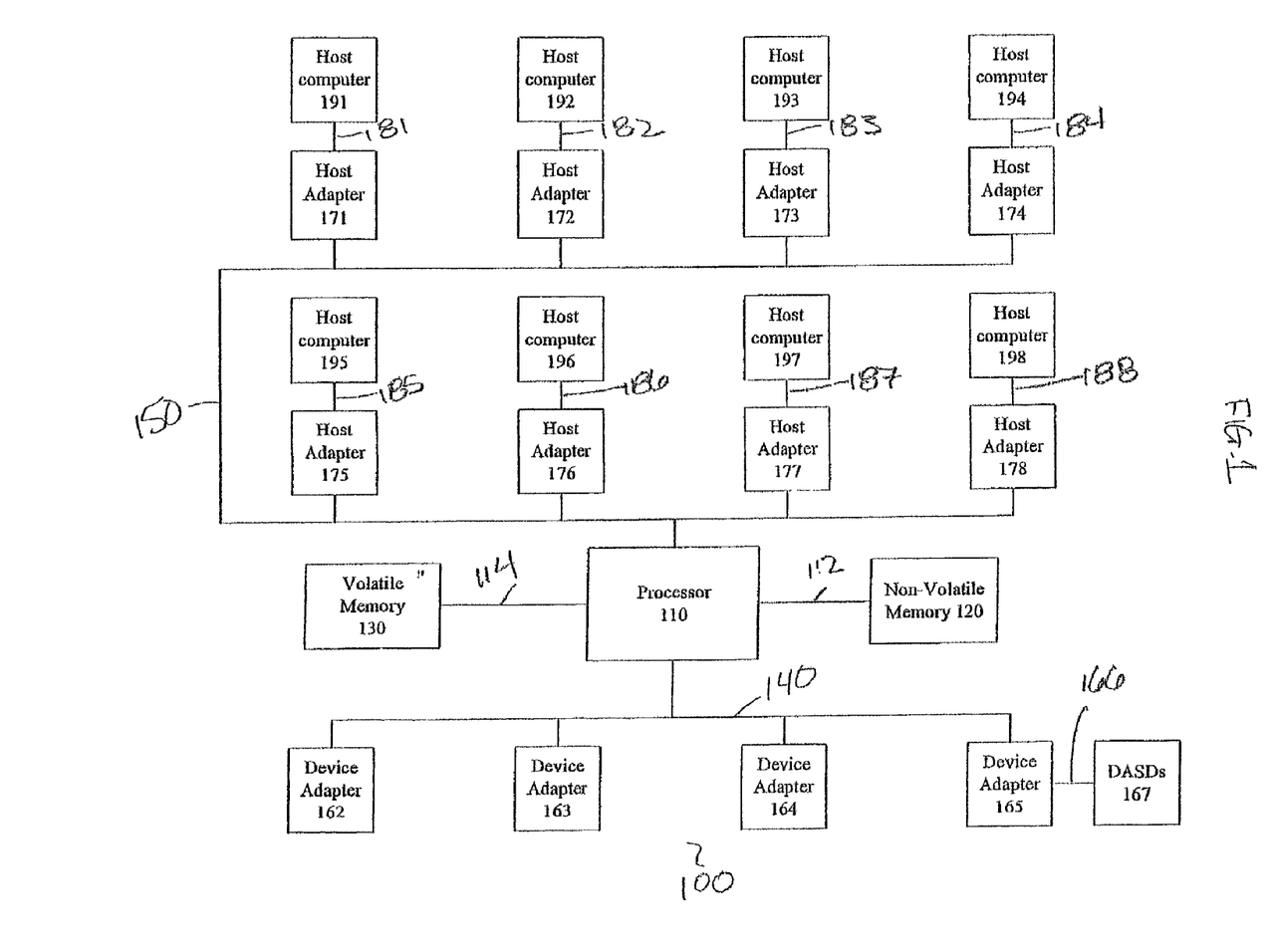
FIG. 1 is a block diagram showing the components of a first embodiment of Applicants' data storage and retrieval system.

Referring to FIG. 1, data storage and retrieval system 100 includes processor 110, nonvolatile memory 120 coupled to processor 110 via communication link 112, volatile memory 130 coupled to processor 110 via communication link 114, device adapter bus 140, and host computer adapter bus 150. In certain embodiments, processor 110 comprises a symmetrical multi-processor, such as the IBM RS/6000 processor.

Nonvolatile memory 120 is selected from the group comprising a hard disk drive, a floppy disk/floppy disk drive combination, an optical disk/optical disk drive combination, an IBM Microdrive, a PCMCIA memory device such as manufactured by Calluna, and solid state nonvolatile memory devices including an erasable programmable read-only memory (EPROM), an electrically erasable programmable read-only memory (EEPROM), Flash PROM, battery backup RAM, and the like. In certain embodiments, volatile memory 130 is integral to processor 110. In other embodiments, volatile memory is a discrete device in communication with processor 110 via communication link 114.

A plurality of host computer adapters are coupled to host computer adapter bus 150. Host computer adapter bus 150 comprises an Ethernet interconnection, a CANbus interconnection, a SCSI interconnection, a Fibre Channel interconnection, an ISA interconnection, a PCI interconnection, a Serial Storage Architecture interconnection, and combinations thereof. In the embodiment shown in FIG. 1, data storage and retrieval system 100 includes host computer adapters 171, 172, 173, 174, 175, 176, 177, and 178. Other embodiments include a single host computer adapter bus with fewer than eight (8) host computer adapters coupled thereto. Other embodiments, include two or more host computer adapter buses, each of which are coupled to eight or fewer host computer adapters.

In the embodiment shown in FIG. 1, system 100 includes a single device adapter bus and four device adapters coupled to that single device adapter bus. In other embodiments, Applicants' data storage and retrieval system includes two or more device adapter buses, each of which may interface with a plurality of device adapters.

Referring again to FIG. 1, device adapters 162, 163, 164, and 165 interface between processor 110 and various data input devices, data output devices, and/or data storage devices. As those skilled in the art will appreciate, such data input/output/storage devices include keyboards, pointing devices, scanners, disk drives, CD-ROM drives, hard disk drive units, optical disk drive units, tape drive units, printers, display monitors, local area network (LAN) adapters, FAX/modem boards, sound boards, etc. Such devices are produced by many different manufacturers and come in various models with varying operational characteristics. The number of possible combinations of data input/output/storage devices in a data storage and retrieval system may be very large.

In the embodiment shown in FIG. 1, device adapter 165 provides an interface between processor 110 and the DASDs, or RAID array of hard disk drives. In certain embodiments, one or more device adapters 162–165 may employ the Serial Storage Architecture (SSA) developed by IBM. In such case, the DASDs may be interconnected in a loop topology including multiple RAID arrays. In certain embodiments, one or more of host computer adapters 171, 172, 173, 174, 175, 176, 177, and/or 128, comprise an Enterprise System Connection (ESCON) adapter which provides access to ESCON channels and connections. In certain embodiments, one or more of first plurality of host computer adapters 270 comprise a series of host computer adapters which connect to a host system.

A plurality of host computers, including host computers 191, 192, 193, 194, 195, 196, 197, and 198, are each in communication with one of the plurality of host computer adapters via one of a plurality of communication links, including links 181, 182, 183, 184, 185, 186, 187, and 188. Communication links 181, 182, 183, 184, 185, 186, 187, and 188 are each selected from the group comprising an RS-422 cable, an RS-232 cable, an Ethernet or a CANbus interconnection, a local area network, a private wide area network, a public wide area network, a SCSI interconnection, a Fibre Channel interconnection, an ISA interconnection, a PCI interconnection, a Serial Storage Architecture interconnection, and combinations thereof.

Figure 2:
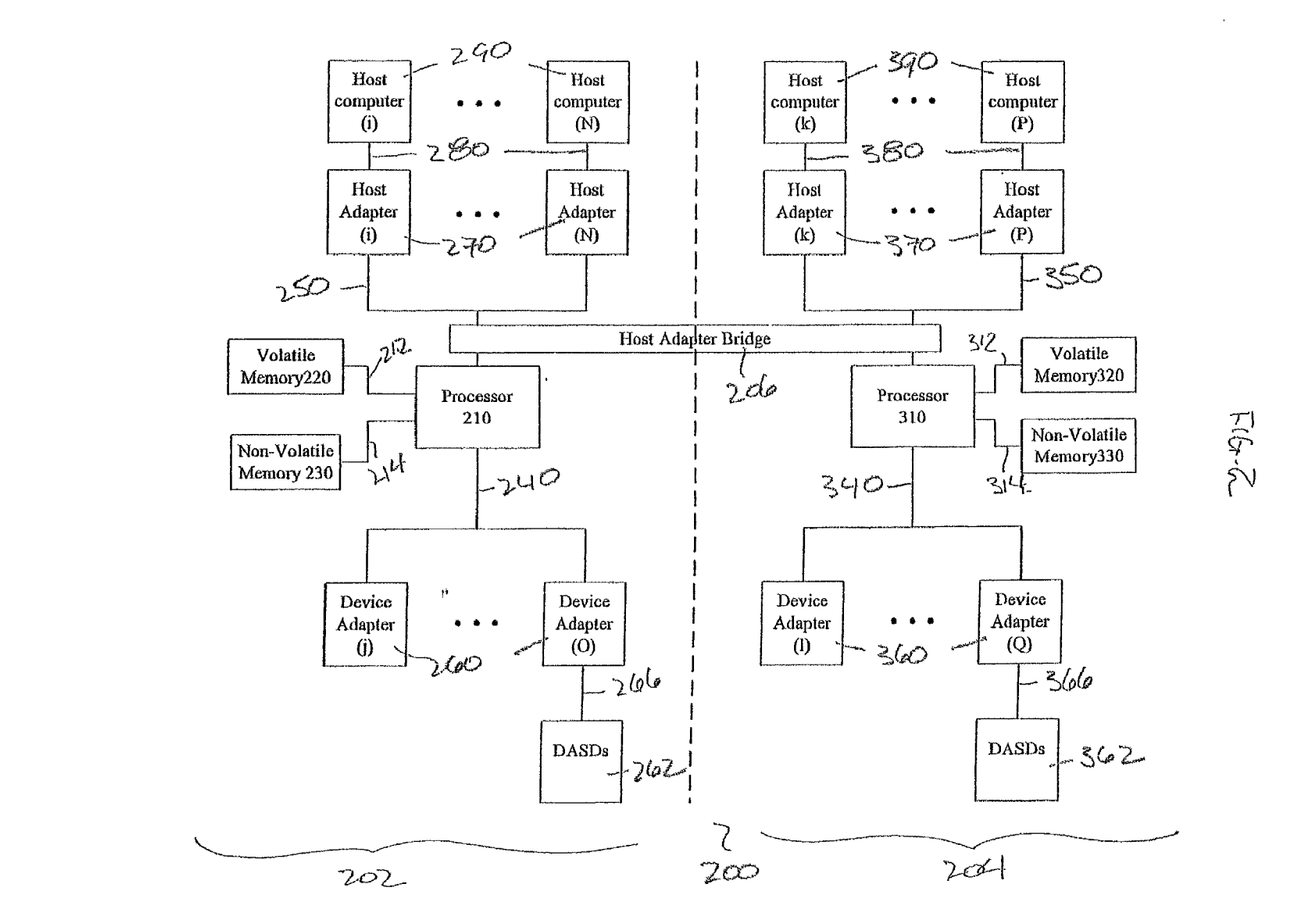
FIG. 2 is a block diagram showing the components of a second embodiment of Applicants' data storage and retrieval system.

FIG. 2 illustrates a block diagram of the components and architecture of Applicants' data storage and retrieval system 200 which includes first cluster 202 and second cluster 204. A host computer adapter bridge 206 interfaces the components of cluster 202 with cluster 204. First plurality of host computer adapters 270 and second plurality of host computer adapters 370 are connected to the host computer adapter bridge 206. In certain embodiments, the bridge 206 is a dual master bus which may be controlled by one of the processors 210 or 310, or one of first plurality of host computer adapters 270/second plurality of host computer adapters 370. In further embodiments, the host computer adapter bridge 206 may include bridge technology to allow the bus to operate at its own clock speed and provide a buffer to buffer data transferred across the bridge 206. The bridge 206 interconnects the first plurality of host computer adapters 270/second plurality of host computer adapters 370 with the processors 210/310. In certain embodiments, the processors 210 and 310 are symmetrical multi-processors, such as the IBM RS/6000 processor. Each processor 210/310 maintains information on the configuration of the other cluster in order to reroute data transfers directed toward the other cluster.

First cluster 202 includes first host computer adapter bus 250, first plurality of host computer adapters 270 connected to bus 250, first plurality of host computers 290, first plurality of interconnections 280 coupling each of first plurality of host computer adapters 270 with one or more of first plurality 290 of host computers, first device adapter bus 240, first plurality of device adapters 260 connected to bus 240, and DASD 262, which may comprise multiple RAID arrays. In one embodiment, DASD 262 comprises magnetic storage units such as hard disk drives.

First host computer adapter bus 250 comprises a serial interconnection, such as an Ethernet interconnection, a CANbus interconnection, a SCSI interconnection, a Fibre Channel interconnection, an ISA interconnection, a PCI interconnection, a Serial Storage Architecture interconnection, and combinations thereof. Device adapter bus 240 interconnects processor 210 with first plurality of device adapters 260. First plurality of device adapters 260 interface between the storage controller and the DASDs, or RAID array of hard disk drives. In certain embodiments, first plurality of device adapters 260 employ the Serial Storage Architecture (SSA) developed by IBM. In such case, the DASDs may be interconnected in a loop topology including multiple RAID arrays.

In the embodiment shown in FIG. 2, first cluster 202 includes (N) host computers, (N) host computer adapters, and (N) interconnections between those host computers and host computer adapters. In certain embodiments, (N) is greater than 1 and less than or equal to 8. In alternative embodiments, a host computer may interconnect with a plurality of host adapters. In yet other alternative embodiments, one or more host adapters may not be connected to a host computer. A host computer adapter that is not attached to a host computer is nevertheless configured using Applicants' method. In these various alternative embodiments, the system may include (N) adapters but less than (N) attached host computers.

In certain embodiments, one or more of first plurality of host computer adapters 270 comprise an Enterprise System Connection (ESCON) adapter which provides access to ESCON channels and connections. In certain embodiments, one or more of first plurality of host computer adapters 270 comprise a series of host computer adapters which connect to a host system. The individual communication links comprising first plurality of interconnections 280 are each selected from the group comprising an RS-232 cable, an RS-422 cable, a SCSI interconnection, a Gigabit Ethernet interconnection, an Ethernet interconnection, a CANbus interconnection, a SCSI interconnection, a Fibre Channel interconnection, an ISA interconnection, a PCI interconnection, a Serial Storage Architecture interconnection, a local area network, a private wide area network, a public wide area network, and combinations thereof.

In certain embodiments, processor 210 includes both volatile memory 220 and non-volatile memory 230. In certain embodiments, non-volatile memory 230 consists of a random access electronic storage with a battery (the "NVS Battery") backup. Storage time for a fully charged NVS Battery may last a couple of days. In certain embodiments, the NVS Battery is continuously charged whenever primary power is applied during normal operations. The battery will supply power necessary to maintain contents of non-volatile memory 230 intact until power is restored. Volatile memory 220, on the other hand, is a volatile storage unit that cannot maintain data in the event of a power failure. As those skilled in the art will appreciate, access times are generally shorter for volatile memory than for non-volatile memory.

Second cluster 204 includes second host computer adapter bus 350, second plurality of host computer adapters 370 connected to bus 350, second plurality of host computers 390, second plurality of interconnections 380 coupling each of second plurality of host computer adapters 370 with one or more of second plurality 390 of host computers, second device adapter bus 340, second plurality of device adapters 360 connected to bus 340, and one or more direct access storage devices ("DASD"), such as DASD 362, which may comprise multiple RAID arrays. In one embodiment, DASD 362 comprises magnetic storage units such as hard disk drives.

Second host computer adapter bus 350 comprises a serial interconnection, such as an Ethernet interconnection, a CANbus interconnection, a SCSI interconnection, a Fibre Channel interconnection, an ISA interconnection, a PCI interconnection, a Serial Storage Architecture interconnection, and combinations thereof. Second device adapter bus 340 interconnects processor 310 with second plurality of device adapters 360. Second plurality of device adapters 360 interface between processor 310 and a plurality of data input/output/storage devices, one or more of which comprise DASDs, or RAID array of hard disk drives. In certain embodiments, second plurality of device adapters 360 employ the Serial Storage Architecture (SSA) developed by IBM. In such case, the DASDs may be interconnected in a loop topology including multiple RAID arrays.

Second cluster 202 includes (P) host computers, (P) host computer adapters, and (P) interconnections between those host computers and host computer adapters. In certain embodiments, (P) is greater than 1 and less than or equal to 8. In certain embodiments, one or more of second plurality of host computer adapters 370 comprise an Enterprise System Connection (ESCON) adapter which provides access to ESCON channels and connections. In certain embodiments, one or more of second plurality of host computer adapters 370 comprise a series of host computer adapters which connect to a host system. The individual communication links comprising second plurality of interconnections 380 are each selected from the group comprising an RS-232 cable, an RS-422 cable, a Gigabit Ethernet interconnection, an Ethernet interconnection, a CANbus interconnection, a SCSI interconnection, a Fibre Channel interconnection, an ISA interconnection, a PCI interconnection, a Serial Storage Architecture interconnection, a local area network, a private wide area network, a public wide area network, and combinations thereof.

In certain embodiments, processor 310 includes both volatile memory 320 and non-volatile memory 330. In certain embodiments, non-volatile memory 330 consists of a random access electronic storage with a battery (the "NVS Battery") backup. Storage time for a fully charged NVS Battery may last a couple of days. In certain embodiments, the NVS Battery is continuously charged whenever primary power is applied during normal operations. The battery will supply power necessary to maintain contents of non-volatile memory 330 intact until power is restored. Volatile memory 320, on the other hand, is a volatile storage unit that cannot maintain data in the event of a power failure.

In order for the components of Applicants' data storage and retrieval system to function together properly and optimally, upon system power-up or upon a system reset, system configuration information must be obtained and system initialization routines executed. The system configuration information is used to initialize the various components of the system, including all host computer adapters and all device adapters. Device registers are set, device parameters are loaded, interrupt vectors are created, etc. Computer operating system and/or other system management software is then configured in accordance with the system configuration information.

Figure 3:
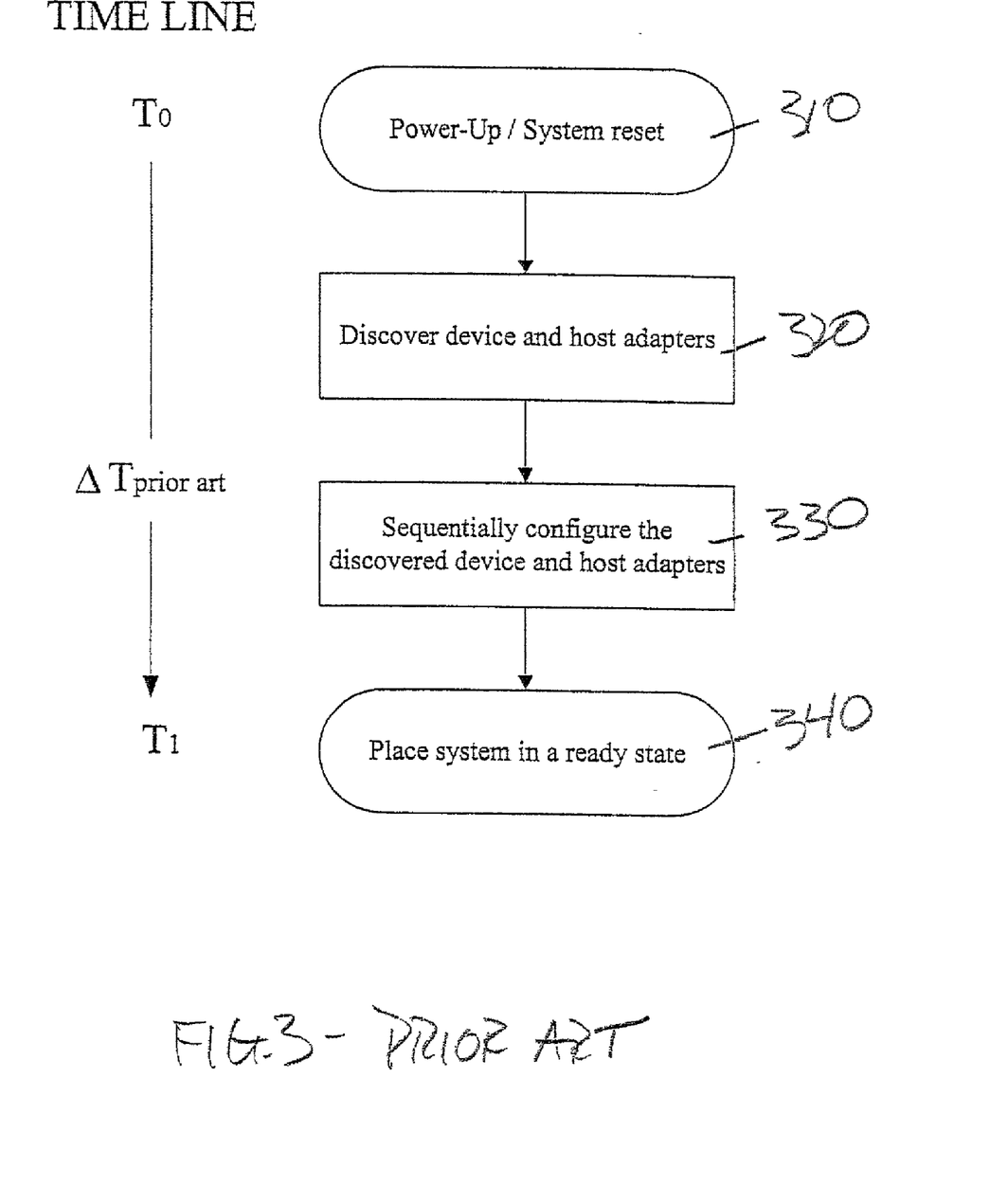
FIG. 3 is a flow chart showing the steps typically used in prior art methods to configure a data storage and retrieval system.

Prior art configuration methods configured the various host computer adapters and device adapters in a sequential, i.e. serial, fashion. Referring now to FIG. 3, such prior art methods upon power-up/system reset in step 310, at a time $T_0$, sequentially discover in step 320 the various host computer adapters and device adapters present. In step 330, those various host/device adapters are then configured sequentially, i.e. one at a time. Once all such host/device adapters are configured, then in step 340 the system is placed in a ready state at a time $T_1$. By ready state, Applicants mean an operational mode wherein the various host computers, such as host computers 191 through 198 (FIG. 1), can write data to, or retrieve data from, data storage devices, such as DASDs 167 (FIG. 1). As those skilled in the art will appreciate, during the time period $\Delta T_{prior\ art}$ the system is not in a ready state, and therefore, is not operational. If the length of the time period between $T_0$ and $T_1$ could be reduced, the efficiency of the data storage and retrieval system would necessarily be enhanced.

Figure 4:
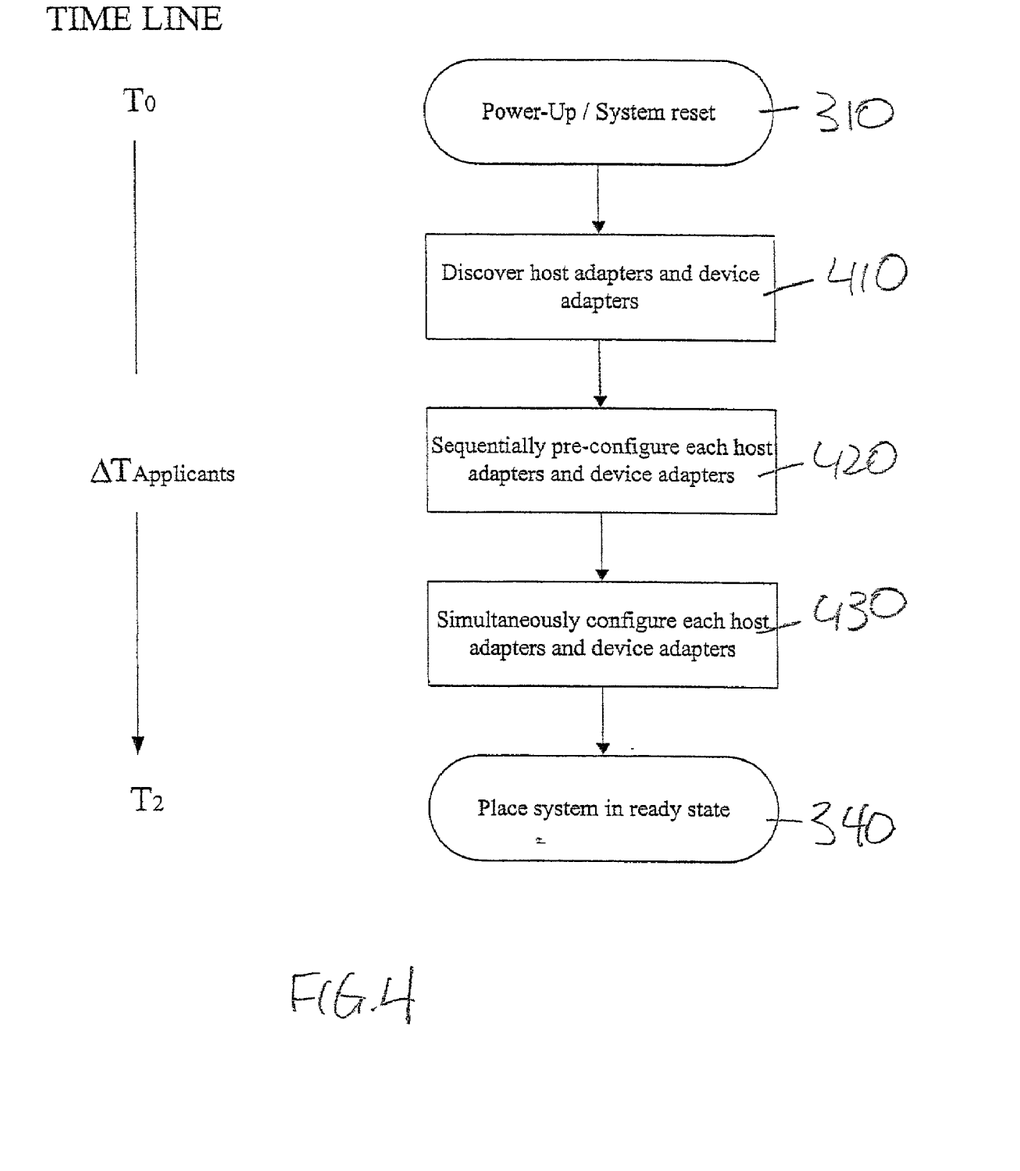
FIG. 4 is a flow chart summarizing Applicants' method to simultaneously configure one or more adapters disposed within a computer system.

FIG. 4 summarizes the steps of Applicants' method to configure system adapters. Upon power-up/system reset at time $T_0$ in step 310, Applicants' method in step 410 first identifies the host computer adapters and device adapters present in the system. In step 420, each of those host computer adapters and device adapters are then sequentially pre-configured. During such a pre-configuration step, a logical name is generated and assigned to a specific device, memory is allocated for that specific device, and device-specific special files are created.

Once all the extant host/device adapters are discovered and pre-configured, then in step 430 all those host computer adapters and device adapters are simultaneously configured. After all the host/device adapters are configured, then in step 340 the system is placed in a ready state at time $T_2$. The time period $\Delta T_{Applicants}$, i.e. the time period between $T_0$ and $T_2$, represents the time period when Applicants' system is not available for use by the on-line host computers, such as host computer 191 (FIG. 1).

The parallel configuration of host/device adapters performed in step 430 of Applicants' method necessarily consumes less time than the sequential configuration process of step 330 (FIG. 3) used in prior art methods. Therefore, $\Delta T_{Applicants}$ is less than $\Delta T_{prior\ art}$. This being the case, Applicants' data storage and retrieval system which employs Applicants' method to configure system adapters is necessarily more efficient than prior art configuration methods.

Figure 5:
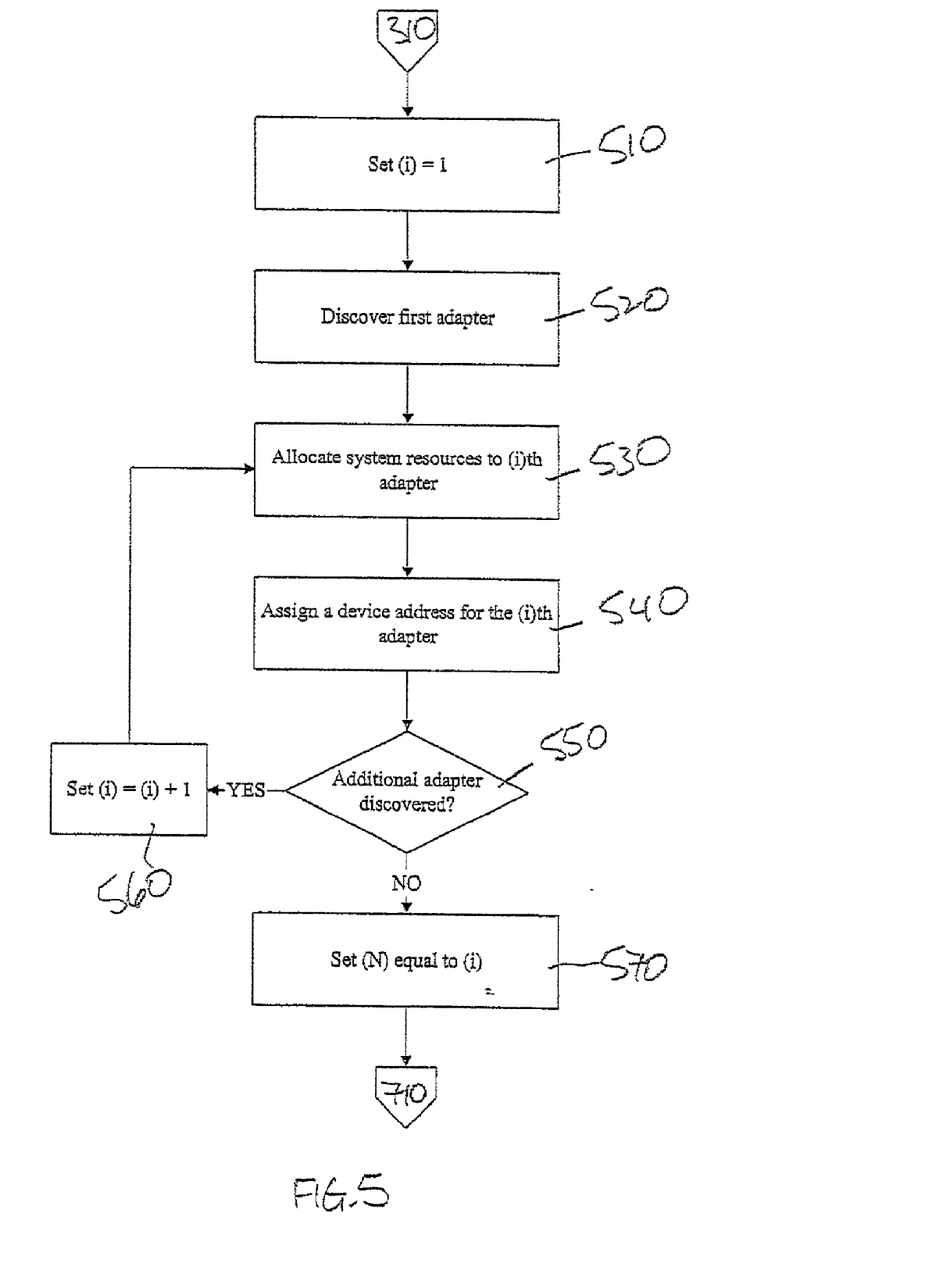
FIG. 5 is a flow chart summarizing additional steps in Applicants' method to simultaneously configure one or more adapters disposed within a computer system.

FIG. 5 summarizes a first embodiment of Applicants' method implementing steps 410 (FIG. 4) and 420 (FIG. 4). In this embodiment, in step 510 a counter (i) which increments when an adapter is identified is initially set to equal 1. In step 520, a controller, such as processor 110 (FIG. 1), "walks" the host computer adapter bus, such as host computer adapter bus 150 (FIG. 1), to discover a first individual host computer adapter, such as host computer adapter 171 (FIG. 1) coupled to that bus.

In steps 530 and 540, the most-recently discovered adapter is "pre-configured." By pre-configured, Applicants mean than certain initialization routines that must necessarily be conducted sequentially are performed. For example, in step 530 required system resources are allocated to the adapter being pre-configured. In step 540, a device address is assigned to the adapter being pre-configured. Additional pre-configuration routines include, for example, assigning a logical name.

After the first-identified host/device adapter is discovered and pre-configured, in step 550 processor 110 (FIG. 1) again "walks" host computer adapter bus 150 to discover additional host computer adapters. In the embodiment of system 100 shown in FIG. 1, processor 110 would sequentially identify a total of eight (8) host computer adapters, namely host computer adapters 171, 172, 173, 174, 175, 176, 177, and 178. After host computer adapter 178 is identified and preconfigured, the counter (i) equals 8.

After the host computer adapters coupled to host computer adapter bus 150 are discovered and pre-configured, then processor 110 "walks" device adapter bus 140 to identify device adapters present in system 100. In this embodiment of Applicants' method, device adapters 162, 163, 164, and 165 are each individually identified and pre-configured.

With respect to system 100 having the resources map recited in FIG. 1, after device adapter 165 has been discovered and pre-configured, all the host/device adapters have been identified and pre-configured. Therefore, after discovering/pre-configuring device adapter 165, in step 550 processor 110 will discover no additional adapters. At this point in Applicants' method counter (i) equals 12. In step 570, the total number of adapters (N) is set to equal (i). In the example using the resources map of FIG. 1, (N) equals 12. Applicants' method then transitions to step 710, and all the (N) adapters are simultaneously configured.

Figure 6:
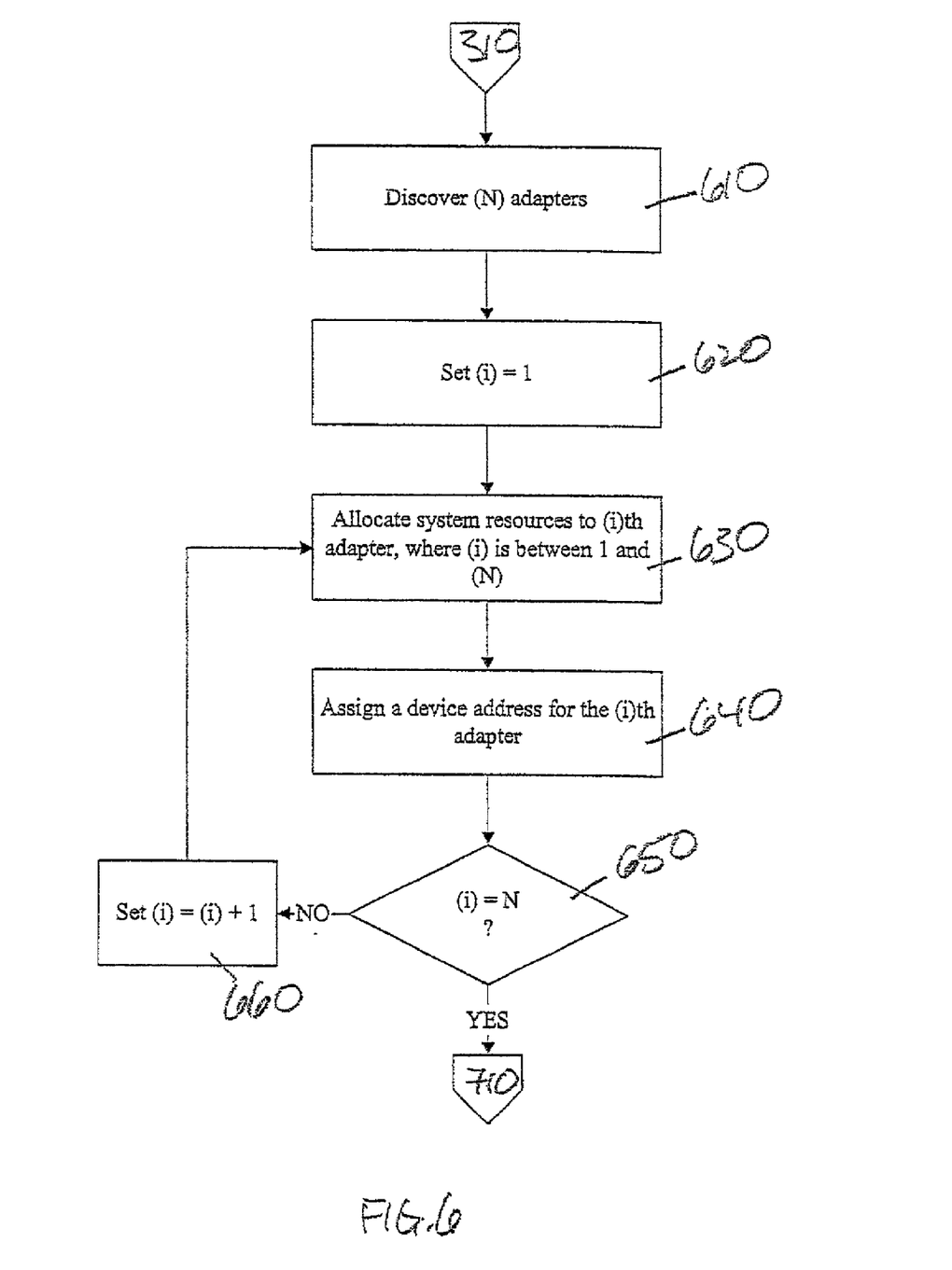
FIG. 6 is a flow chart summarizing additional steps in Applicants' method to simultaneously configure one or more adapters disposed within a computer system.

FIG. 6 summarizes an alternative implementation of steps 410 (FIG. 4) and 420 (FIG. 4). In this embodiment, in step 610 a system controller, such as processor 110 (FIG. 1), first identifies each host computer adapter bus, all the host computer adapters coupled to those host computer adapter buses, each device adapter bus, and all the device adapters coupled to those device adapter buses. In this embodiment, Applicants' method first discovers all (N) adapters present before pre-configuring any individual adapter.

After discovering in step 610 all the adapters present in the data storage and retrieval system, in step 620 a counter (i) is set to equal 1. Thereafter, in steps 630 and 640 each adapter is sequentially pre-configured. In step 650, processor 110 (FIG. 1) ascertains if all the identified adapters have been pre-configured by determining if the counter (i) equals the number (N) of adapters present. In the event (i) is less than (N), Applicants' method transitions to step 660 where the counter (i) is incremented, and then to step 630 where the next adapter is pre-configured. After all adapters have been discovered and pre-configured, Applicants' method transitions to step 710 and all the (N) adapters are simultaneously configured.

Figure 7:
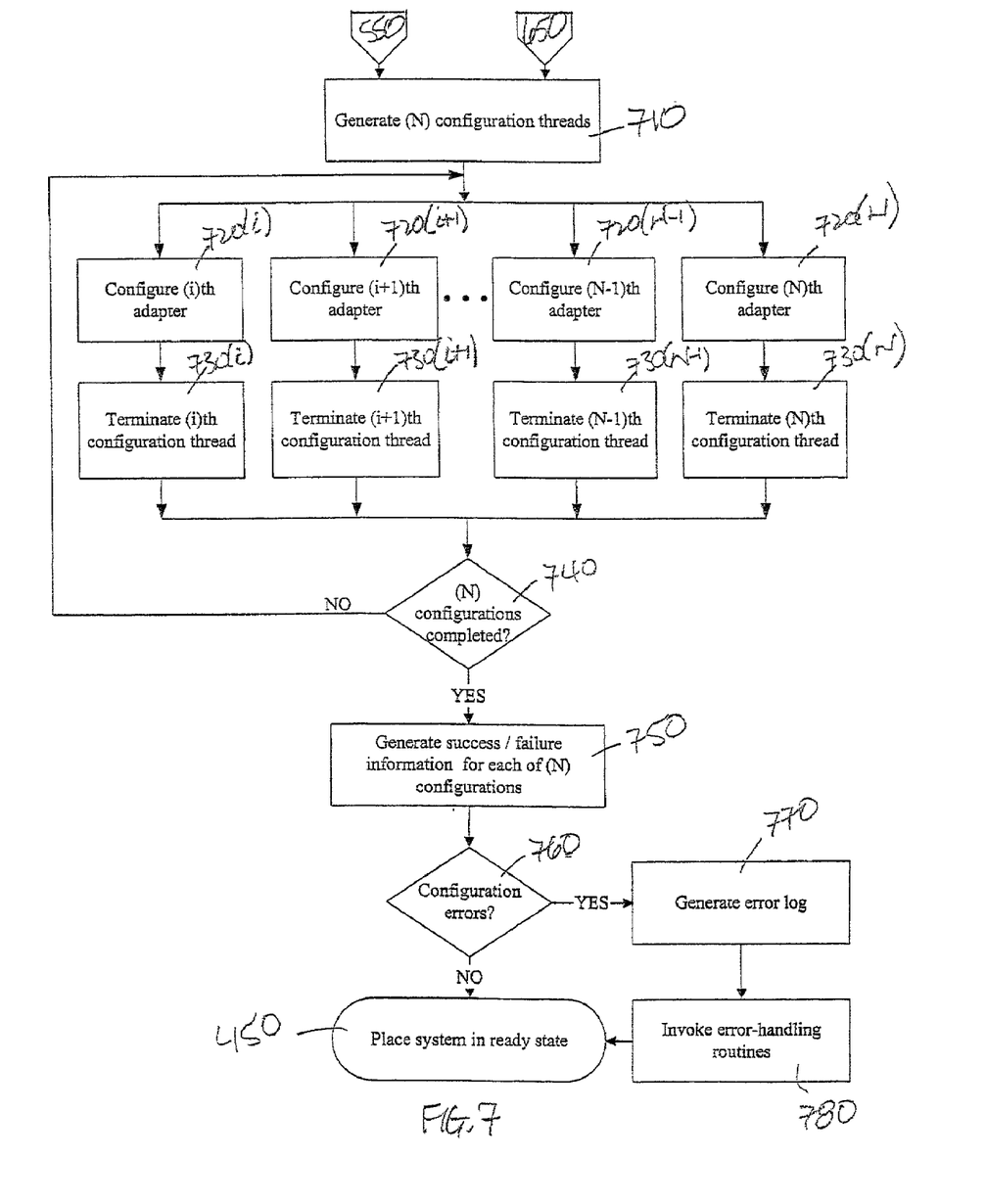
FIG. 7 is a flow chart summarizing additional steps in Applicants' method to simultaneously configure one or more adapters disposed within a computer system.

FIG. 7 summarizes Applicants' method to implement step 430 (FIG. 4). Regardless of whether the embodiment of Applicants' method summarized in FIG. 5 or the embodiment of Applicants' method summarized in FIG. 6 is used, the total number (N) of adapters present has been determined, and all those (N) adapters have been pre-configured.

In step 710, Applicants' method generates (N) configurations threads. By configuration thread, Applicants mean a series of computer steps to configure the (i)th adapter disposed within Applicants' data storage and retrieval system. In a plurality of steps 720, each of the discovered (N) adapters is simultaneously configured. By simultaneously configured, Applicants mean that the configuration of each of the (N) adapters is commenced simultaneously. By commenced simultaneously, Applicants mean that the configuration of each the individual (N) adapters commences within a time period of about one second or less. As those skilled in the art will appreciate, even though the configuration routines for the (N) adapters embodied in the (N) individual configuration threads is commenced simultaneously, that plurality of configuration routines will not necessarily be completed at the same time.

For example, in step 720(i) the (i)th adapter is configured using the (i)th configuration thread, while in step 720(i+1) the (i+1)th adapter is configured using the (i+1)th configuration thread, while in step 720(N−1) the (N−1)th adapter is configured using the (N−1)th configuration thread, while in step 720(N) the (N)th adapter is configured using the (N)th configuration thread.

After the (i)th adapter is configured in step 720(i), then Applicants' method transitions to step 730(i) wherein processor 110 (FIG. 1) terminates the (i)th configuration thread. After terminating the (i)th configuration thread, in step 740 processor 110 then determines if all (N) adapters have been configured. In the event one or more adapters are still being configured, Applicants' method transitions to step 720 to allow the simultaneous configuration process to continue. In the event all adapters have been configured, then Applicants' method transitions to step 750 where processor 110 tests the operability of each of the (N) adapters to ascertain whether each of those (N) adapters has been successfully configured.

In the event processor 110 finds no configuration errors, then in step 760 Applicants' method transitions to step 450 wherein the system is placed in a ready state. On the other hand, if processor 110 determines that the performance of one or more adapters is not optimal, then in step 760 Applicants' method transitions to step 770 wherein processor 770 generates an error log. In certain embodiments, the error log generated in step 770 is displayed to the user via a visual display device. In certain embodiments, the error log generated in step 770 is printed using an attached printing device. In certain embodiments, the error log generated in step 770 is saved in non-volatile memory, such as non-volatile memory 120 (FIG. 1) and/or in volatile memory, such as volatile memory 130 (FIG. 1).

After generating an error log in step 770, processor 110 then invokes one or more error-handling routines to cure and/or mitigate the effects of an improper configuration of one or more adapters disposed within the system. Thereafter, Applicants' method transitions to step 450 wherein the system is placed in a ready state.

Applicants' invention includes a data storage and retrieval system comprising a computer useable medium having computer readable program code disposed therein for implementing Applicants' method discussed above to simultaneously configure one or more host computer adapters and/or one or more data input device adapters, and/or one or more data output device adapters, and/or one or more data storage device adapters. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to configure (N) adapters interconnected to one of two or more buses disposed within a computer system, comprising the steps of:
   (a) discovering each of said (N) adapters;
   (b) sequentially pre-configuring each of said (N) adapters;
   (c1) generating (N) configuration threads, wherein the (i)th configuration thread comprises a series of computer steps to configure the (i)th adapter disposed within a data storage and retrieval system, wherein (i) is an integer equal to or greater than 1 and equal to or less than (N);
   (c2) simultaneously beginning to set device registers, load device parameters, and create interrupt vectors, for each of said (N) adapters using said (N) configuration threads; and
   (d) placing said computer system in a ready state.

2. The method of claim 1, wherein each of said (N) adapters is selected from the group consisting of a host computer adapter, a data input device adapter, a data output device adapter, and a data storage device adapter.

3. The method of claim 1, wherein steps (a) and (b) further comprise the steps of:
   (e) discovering the (i)th adapter;
   (f) allocating system resources for the (i)th adapter; and
   (g) assigning a device address for the (i)th adapter.

4. The method of claim 3, further comprising the steps of:
   (h) determining if (i) equals (N); and
   (j) if (i) does not equal (N), incrementing (i) and repeating steps (e), (f), (g), (h) and (j) until each of said (N) adapters has been discovered.

5. The method of claim 1, wherein steps (a) and (b) further comprise the steps of:
   (k) discovering each of said (N) adapters;
   (l) allocating system resources for the (i)th adapter, wherein (i) is an integer equal to or greater than 1 and equal to or less than (N); and
   (m) assigning a device address for the (i)th adapter.

6. The method of claim 5, further comprising the steps of:
   (n) determining if (i) equals (N); and
   (o) if (i) does not equal (N), incrementing (i) and repeating steps (l), (m), (n), and (o) until system resources have been allocated for each of said (N) adapters.

7. The method of claim 6, further comprising the steps of:
   (p) testing the performance of each of said (N) adapters;
   (q) generating an error log; and
   (r) invoking error-handling routines.

8. A method to configure (N) host computer adapters disposed within a data storage and retrieval system, wherein (N) is greater than or equal to 1, comprising the steps of:
   sequentially discovering each of said (N) host computer adapters;
   sequentially allocating system resources for each of said (N) host computer adapters;
   sequentially assigning a device address for each of said (N) host computer adapters;
   generating (N) configuration threads;
   simultaneously beginning to set device registers, load device parameters, and create interrupt vectors, for each of said (N) host computer adapters using said (N) configuration threads;
   terminating at different times each of said (N) configuration threads; and
   placing said data storage and retrieval system in a ready state.

9. The method of claim 8, further comprising the steps of:
   testing the performance of each of said (N) host computer adapters;
   generating an error log; and
   invoking error-handling routines.

10. A computer system comprising a computer useable medium having computer readable program code disposed therein for simultaneously configuring (N) adapters interconnected to one of two or more buses disposed within said system, the computer readable program code comprising a series of computer readable program steps to effect:
   (a) discovering each of said (N) adapters;
   (b) sequentially pre-configuring each of said (N) adapters;
   (c1) generating (N) configuration threads, wherein the (i)th configuration thread comprises a series of computer steps to configure the (i)th adapter disposed within a data storage and retrieval system, wherein (i) is an integer equal to or greater than 1 and equal to or less than (N);
   (c2) simultaneously beginning to set device registers, load device parameters, and create interrupt vectors, for each of said (N) adapters using said (N) configuration threads; and
   (d) placing said computer system in a ready state.

11. The computer system of claim 10, wherein each of said a (N) adapters are selected from the group consisting of a host computer adapter, a data input device adapter, a data output device adapter, and a data storage device adapter.

12. The computer system of claim 10, wherein said computer readable program code to effect steps (a) and (b) further comprises a series of computer readable program steps to effect:
   (e) discovering the (i)th adapter, wherein (i) is an integer equal to or greater than 1 and equal to or less than (N);
   (f) allocating system resources for the (i)th adapter;
   (g) assigning a device address for the (i)th adapter.

13. The computer system of claim 12, wherein said computer readable program code further comprises a series of computer readable program steps to effect:
- (h) determining if (i) equals (N); and
- (j) if (i) does not equal (N), incrementing (i) and repeating steps (e), (f), (g), (h) and (j) until each of said (N) adapters has been discovered.

14. The computer system of claim 10, wherein said computer readable program code to effect steps (a) and (b) further comprises a series of computer readable program steps to effect:
- (k) discovering each of said (N) adapters;
- (l) allocating system resources for the (i)th adapter, wherein (i) is an integer equal to or greater than 1 and equal to or less than (N); and
- (m) assigning a device address for the (i)th adapter.

15. The computer system of claim 14, wherein said computer readable program code further comprises a series of computer readable program steps to effect:
- (n) determining if (i) equals (N); and
- (o) if (i) does not equal (N), incrementing (i) and repeating steps (l), (m), (n), and (o) until each of said (N) adapters has been discovered.

16. The computer system of claim 10, wherein said computer readable program code further comprises a series of computer readable program steps to effect:
- (p) testing the performance of each of said (N) adapters;
- (q) generating an error log; and
- (r) invoking error-handling routines.

17. A data storage and retrieval system comprising a computer useable medium having computer readable program code disposed therein for simultaneously configuring (N) host computer adapters disposed within said system, the computer readable program code comprising a series of computer readable program steps to effect:
- sequentially discovering each of said (N) host computer adapters;
- sequentially allocating system resources for each of said (N) host computer adapters;
- sequentially assigning a device address for each of said (N) host computer adapters;
- generating (N) configuration threads;
- simultaneously beginning to set device registers, load device parameters, and create interrupt vectors, for each of said (N) host computer adapters using said (N) configuration threads;
- terminating at different times each of said (N) configuration threads; and
- placing said data storage and retrieval system in a ready state.

18. The data storage and retrieval system of claim 17, wherein said computer readable program code further comprises a series of computer readable program steps to effect:
- testing the performance of each of said (N) host computer adapters;
- generating an error log; and
- invoking error-handling routines.

19. A computer program product usable with a programmable computer processor having computer readable program code embodied therein for configuring (N) adapters interconnected to one of two or more buses disposed within a computer system, comprising:
- computer readable program code which causes said programmable computer processor to discover each of said plurality of adapters;
- computer readable program code which causes said programmable computer processor to sequentially pre-configure each of said plurality of adapters;
- computer readable program code which causes said programmable computer processor to generate (N) configuration threads, wherein the (i)th configuration thread comprises a series of computer steps to configure the (i)th adapter disposed within a data storage and retrieval system, wherein (i) is an integer equal to or greater than 1 and equal to or less than (N);
- computer readable program code which causes said programmable computer processor to simultaneously begin to set device registers, load device parameters, and create interrupt vectors, for each of said (N) adapters using said (N) configuration threads; and
- computer readable program code which causes said programmable computer processor to place said computer system in a ready state.

20. The computer program product of claim 19, wherein each of said (N) adapters are selected from the group consisting of a host computer adapter, a data input device adapter, a data output device adapter, and a data storage device adapter.

21. The computer program product of claim 19, wherein computer readable program code which causes said programmable computer processor to discover each of said plurality of adapters and to sequentially pre-configure each of said plurality of adapters further comprises:
- computer readable program code which causes said programmable computer processor to discover, for each value of (i), the (i)th adapter, wherein (i) is an integer equal to or greater than 1 and equal to or less than (N);
- computer readable program code which causes said programmable computer processor to allocate, for each value of (i), system resources for the (i)th adapter; and
- computer readable program code which causes said programmable computer processor to assign, for each value of (i), a device address for the (i)th adapter.

22. The computer program product of claim 19, wherein said computer readable program code which causes said programmable computer processor to discover each of said plurality of adapters and to sequentially pre-configure each of said plurality of adapters further comprises:
- computer readable program code which causes said programmable computer processor to discover each of said (N) adapters;
- computer readable program code which causes said programmable computer processor to allocate, for each value of (i), system resources for the (i)th adapter, wherein (i) is an integer equal to or greater than 1 and equal to or less than (N); and
- computer readable program code which causes said programmable computer processor to assign, for each value of (i), a device address for the (i)th adapter.

23. The computer program product of claim 19, further comprising:
- computer readable program code which causes said programmable computer processor to test the performance of each of said (N) adapters;
- computer readable program code which causes said programmable computer processor to generate an error log; and
- computer readable program code which causes said programmable computer processor to invoke error-handling routines.

24. A computer program product usable with a programmable computer processor having computer readable program code embodied therein for simultaneously configuring (N) host computer adapters disposed within a data storage and retrieval system, comprising:

computer readable program code which causes said programmable computer processor to sequentially discover each of said (N) host computer adapters;

computer readable program code which causes said programmable computer processor to sequentially allocate system resources for each of said (N) host computer adapters;

computer readable program code which causes said programmable computer processor to sequentially assign a device address for each of said (N) host computer adapters;

computer readable program code which causes said programmable computer processor to generate (N) configuration threads;

computer readable program code which causes said programmable computer processor to simultaneously begin to set device registers, load device parameters, and create interrupt vectors, for of each of said (N) host computer adapters using said (N) configuration threads;

computer readable program code which causes said programmable computer processor to terminate at different times each of said (N) configuration threads; and computer readable program code which causes said programmable computer processor to place said data storage and retrieval system in a ready state.

25. The computer program product of claim 24, further comprising:

computer readable program code which causes said programmable computer processor to test the performance of each of said (N) host computer adapters;

computer readable program code which causes said programmable computer processor to generate an error log; and computer readable program code which causes said programmable computer processor to invoke error-handling routines.

* * * * *